United States Patent [19]

Hitzfeld et al.

[11] Patent Number: 4,891,114

[45] Date of Patent: Jan. 2, 1990

[54] MAGNETIC RECORDING MEDIA

[75] Inventors: Michael Hitzfeld, Gruenstadt; Werner Grau, Bobenheim-Roxheim; Joachim Hack, Ludwigshafen, all of Fed. Rep. of Germany

[73] Assignee: BASF Aktiengesellschaft, Ludwigshafen, Fed. Rep. of Germany

[21] Appl. No.: 134,883

[22] Filed: Dec. 18, 1987

[30] Foreign Application Priority Data

Dec. 31, 1986 [DE] Fed. Rep. of Germany ....... 3644823

[51] Int. Cl.$^4$ ............................ C23C 4/00; G11B 5/64
[52] U.S. Cl. ........................... 204/192.15; 204/192.16; 428/64; 428/694; 428/900
[58] Field of Search ................ 428/695, 408; 427/131, 427/694, 64; 204/192.15, 192.16, 192.2

[56] References Cited

U.S. PATENT DOCUMENTS

| | | | |
|---|---|---|---|
| 32,464 | 7/1987 | Aine . | |
| 4,411,963 | 10/1983 | Aine . | |
| 4,429,016 | 1/1984 | Sugita | 427/131 |
| 4,524,106 | 6/1985 | Flasck . | |
| 4,647,494 | 3/1987 | Meyerson | 428/408 |
| 4,707,756 | 11/1987 | Futamoto | 427/131 |
| 4,713,288 | 12/1987 | Kokaku et al. | 204/182.16 |
| 4,717,622 | 1/1988 | Kurokawa | 428/408 |
| 4,725,482 | 2/1988 | Komoda | 428/215 |
| 4,737,419 | 4/1988 | Hilden et al. | 204/192.16 |
| 4,767,517 | 8/1988 | Hiracki et al. | 204/192.15 |

FOREIGN PATENT DOCUMENTS

| | | |
|---|---|---|
| 033521 | 10/1979 | Japan . |
| 045412 | 3/1986 | Japan . |
| 054036 | 3/1986 | Japan . |
| 046423 | 2/1987 | Japan . |

OTHER PUBLICATIONS

Shun-ichi Iwasaki & Yoshihisa Nakamura, "IEEE Transactions on Magnetics," vol. 1, Mag-13, No. 5, pp. 1272-1277, (1977).
Buttafava et al., "IEEE Transactions on Magnetics", vol. Mag-21, No. 5, p. 1533, (1985).
J. Appl. Phys. 57, p. 4019, (1985).
John L. Vossen & Werner Kern, "Thin Film Processes", Academic Press, Inc., 1978, pp. 131-173.
Patent Abstracts of Japan, vol. 7, Nr. 290, 1983, p. 130.
Patent Abstracts of Japan, vol. 9, No. 254, (1985), p. 65.
Patent Abstracts of Japan, vol. 7, No. 38, (1983), p. 36.

*Primary Examiner*—Paul J. Thibodeau
*Attorney, Agent, or Firm*—Keil & Weinkauf

[57] ABSTRACT

Magnetic recording media consist of a flexible disk-shaped nonmagnetic base, a cobalt/chromium layer applied thereto and suitable for vertical recording, and a friction-reducing layer of amorphous carbon present on this alloy layer.

1 Claim, No Drawings

MAGNETIC RECORDING MEDIA

The present invention relates to magnetic recording media consisting of a flexible disk-shaped nonmagnetic base, a cobalt/chromium alloy layer applied thereto and suitable for vertical recording, and a friction-reducing layer present on this alloy layer, and a process for its production.

The magnetic recording technique which has long been used is based on the production of differently magnetized areas in a magnetizable layer, and the storage of these areas by the residual magnetization remaining after the recording field has declined. In existing magnetic recording media, both with magnetic layers of the pigment/binder type and with homogeneous metal layers, the magnetic direction of the information-carrying magnetization is in the plane of the layer. However, this longitudinal recording method has the disadvantage that, in the case of an extreme increase in the recording density, demagnetization losses occur as a result of the mutual interaction of the magnetic areas, and these losses cannot be adequately limited even when the thickness of the magnetic layer is reduced as far as is technically possible.

Vertical alignment of the magnetization direction of the magnetic layer has therefore been suggested (S. Iwasaki et al., IEEE Trans. Mag., Vol. MAG-13, no. 5, pages 1272-1277, 1977). The advantage of vertical data storage is that there is less mutual interaction between the magnetic areas, so that the magnetization zones, ie. the bit sizes, can be greatly reduced. Particularly in the case of flexible recording disks, this procedure is expected to lead to an extremely promising increase in the recording density. These recording media are produced by depositing a cobalt/chromium alloy having a chromium content of 15-25 atom %, under reduced pressure. In this method, columnar growth of the alloy layer means that the columns having a hexagonal crystal structure and a mean diameter of 100 nm are magnetically decoupled from one another, and that the pronounced anisotropy of the crystals permits magnetization vertically with respect to the surface of the metal layer.

These recording media can be operated with both magnetic ring core heads and special single-pole heads. In order to be able to utilize the total storage capacity of such recording media, they must be used by the contact method, like the conventional flexible recording disks. However, precisely in the case of the thin metallic cobalt/chromium layer, this results in very rapid wear. To increase the life of these storage media, it has been proposed that liquid oligomers be applied to the surface of the layer (Buttafava et al., IEEE Trans. Magn. Vol. MAG-21, no. 5, page 1533, 1985). However, such oils adhere very poorly to metal surfaces and, furthermore, metering is very critical since excessively thick layers lead to sticking and to smearing of the head. Furthermore, hardening of the metal surface by partial oxidation of the boundary layer, which was reported by Y. Nakatsuka et al. at the Intermag Conference 1986 in Phoenix, entails difficulties, since the oxide layer results in an excessively high coefficient of friction. Another possible method of hardening the magnetic layer based on cobalt/chromium is described in J. Appl. Phys. 57 (1985), 4019. According to this method, alloying zirconium and tantalum to the metallic magnetic layer is supposed to improve the mechanical stability of the layer. However, this procedure has an adverse effect on the magnetic characteristics of the layer.

It is an object of the present invention to provide magnetic recording media which possess, on a flexible disk-shaped nonmagnetic base, a cobalt/chromium alloy layer which is suitable for vertical recording and a friction-reducing layer present on this alloy layer, and in which the stated disadvantages do not occur and which in particular have a long life. It is a further object of the invention to provide a process for the production of these magnetic recording media.

We have found that this object is achieved if the friction-reducing layer is a 5-100 nm thick amorphous carbon layer produced by sputtering.

The present invention furthermore relates to a process for the production of these special magnetic recording media. For this purpose, the amorphous carbon layer is produced by means of a DC magnetron sputter process, it being particularly advantageous if, in this method of application, an RKP value of from 1 to 10, preferably from 2 to 5, is maintained. The RKP value is defined as the product of argon sputter pressure, in Pascal, and the specific sputter power in watt per cm$^2$, the specific sputter power being the ratio of the applied electrical power at the target, in watt, to the total target area in cm$^2$. At an RKP value of from 1 to 10, the resulting amorphous carbon layers have optimum frictional properties.

Disk-shaped magnetic recording media having a cobalt/chromium alloy layer suitable for vertical recording are known. They are produced by DC magnetron sputtering. This process is known and is described, for example, in Thin Film Processes, Academic Press, Vossen, John L. and Kern, Werner, 1978, pages 131-173. This procedure has the advantages of the sputtering technique in conjunction with a maximum rate of layer growth. The cathode and anode are located inside a vacuum chamber. The anode is formed by the substrate. A thick disk of the desired CoCr alloy, the target, is stuck to the cathode. The sputter gas flows into the vacuum chamber through the controllable argon inlet valve, until the desired sputter pressure is obtained. The argon gas is then ionized with electrons from an incandescent filament. Because of its positive charge, the argon ion is accelerated toward the negatively charged target, and with its kinetic energy expels, or sputters, neutral atoms out of the surface of the target, which are deposited as sputtered particles on the substrate. Once triggered, this process is maintained by the physical processes with-in the argon plasma itself.

With such a process, for example, a 75 $\mu$m thick polyimide film as the substrate is coated on both sides with 380 nm of $Co_{80}Cr_{20}$ at 170° C. by sputtering. The film is treated by corona discharge beforehand. The magnetic layer is applied by the DC magnetron method. The argon sputter pressure is $2 \times 10^{-3}$ mmHg. It is important that the basic vacuum of $2 \times 10^{-7}$ mmHg is present before the beginning of the process. Excellent magnetic and crystallographic properties are obtained using such production parameters. Typical data are the following:

| | | |
|---|---|---|
| $H_c$ | 700 Oe | coercive force |
| $H_k$ | 3,600 Oe | anisotropic force |
| $M_s$ | 650 mT | saturation magnetization |
| Theta | 3.5 degrees | width of the crystallographic |

| -continued |
| --- |
| (002) cobalt reflection. |

Recording media of this type are then brought into contact, according to the invention, with an amorphous carbon layer. For this purpose, the flexible substrate film provided with the cobalt/chromium layer is further processed in the same apparatus, advantageously directly thereafter. Graphitic carbon alone is used as the target. The target power density is from 1 to 10 watt/cm$^2$ and the argon sputter pressure is from 0.2 to 1.5 Pascal. The novel process gives corresponding magnetic recording media which have an improved life in conventional operation.

In carrying out this process according to the invention, it has proven advantageous if the RKP value is from 1 to 10, preferably from 2 to 5.

For example, flexible recording disks which have a diameter of 5.25 inches and possess a 350 nm thick cobalt/chromium layer as a magnetic layer on both sides of a polyimide film have coefficients of friction of from 0.27 to 0.32, measured with the aid of a strain gage, in standard operation at 300 rpm using an FD head, under a head contact pressure of 18 p. However, the test has to be stopped after a running time of 7 minutes owing to damage to the magnetic layer. If, on the other hand, the same experimental set-up is used to test a similar recording disk which, however, has a 40 nm thick amorphous carbon layer on the magnetic layer, the coefficient of friction at the beginning is 0.11, reaching its saturation value at 0.22. Furthermore, the test can be ended after 60 minutes without any damage to the magnetic layer.

The recording media having the carbon layer also give excellent results in the accelerated life simulation test. In this test, a recording disk is operated on a conventional drive at 100 rpm, and an AlTiC pin having a radius of 25 mm is pressed against the magnetic layer under a contact pressure of 40 p, as a dummy head. Whereas a cobalt/chromium layer without a carbon layer has worn down to the base film after only 6 seconds, in the case of a disk of this type having a carbon layer the test can be terminated after 1,500 seconds without damage to the magnetic layer.

We claim:

1. A process for the production of a magnetic recording medium consisting of a flexible disk-shaped non-magnetic base, a cobalt/chromium alloy layer applied thereto and suitable for vertical recording, and a friction-reducing layer present on this alloy layer, wherein a 5-100 nm thick amorphous carbon layer produced by a DC magnetron sputter process is applied as the friction-reducing layer and wherein the DC magnetron sputter process is carried out at an RKP value of from 1 to 10.

* * * * *